United States Patent [19]
Böttger et al.

[11] Patent Number: 5,708,332
[45] Date of Patent: Jan. 13, 1998

[54] DUAL MOTOR DRIVE SYSTEM

[75] Inventors: Johannes Böttger, Weinhöhla; Victor Hefftler; Arndt Jentzsch, both of Coswig, all of Germany

[73] Assignee: KBA-Planeta AG, Germany

[21] Appl. No.: 509,984

[22] Filed: Aug. 1, 1995

[30] Foreign Application Priority Data

Jan. 31, 1995 [DE] Germany .................. 195 02 909.7

[51] Int. Cl.[6] ........................................ H02P 7/68
[52] U.S. Cl. ...................... 318/45; 318/77; 318/85; 318/99
[58] Field of Search ..................... 318/41–48, 52, 318/85, 98–100, 432–434, 6, 7, 77, 78

[56] References Cited

U.S. PATENT DOCUMENTS

| | | | |
|---|---|---|---|
| 3,688,167 | 8/1972 | Ivey et al. | 318/45 |
| 4,035,698 | 7/1977 | Soderberg | 318/52 |
| 4,056,759 | 11/1977 | Mitsui et al. | 318/98 |
| 4,136,303 | 1/1979 | Almquist et al. | 318/52 |
| 5,049,798 | 9/1991 | Jackson | 318/640 |

*Primary Examiner*—Brian Sircus
*Attorney, Agent, or Firm*—Schweitzer Cornman Gross & Bondell LLP

[57] ABSTRACT

A dual motor drive system particularly adapted for the drive of long printing presses provides uncoupled control of both the voltage and current provided to the motors. A current divider proportions the current provided to a main and secondary motor in accordance with a chosen ratio to maintain speed and torque in accordance with press requirements.

4 Claims, 1 Drawing Sheet

DUAL MOTOR DRIVE SYSTEM

FIELD OF THE INVENTION

The present invention relates to a dual motor drive system for printing presses in which several printing units are connected together by a gear train.

BACKGROUND OF THE INVENTION

Traditionally, a printing press system is driven by a single motor, which operates the various portions of the system as interconnected by gears, etc. As the size of printing press systems expanded, it became appreciated that the use of multiple motors, located at different positions about the system, could provide the necessary torque while avoiding the overall increased size required by a single motor. Because of the requirement that the operation of the motors be highly synchronized, both as to speed and torque, such multiple motor configurations have been in general unsatisfactory. German Patent No. 4,132,765 discloses a two-motor system having closed loop speed control for the first or master motor. Such a drive system is appropriate in press systems having up to 6 printing units. In printing presses with a larger number of units, the so-called "long" presses, vibrational natural frequencies are reduced, while the amplitudes or torsional vibrations are increased. Such disturbances may lead to printing problems. In addition, the loads at the connecting points between the motors and the press is high, which may cause manufacturing problems and wear. The system of the German '764 patent is unsatisfactory in such long presses.

It is accordingly a purpose of the present invention to provide a dual motor drive system, especially adapted for long presses, which provides for synchronism between the motors and does not create additional vibrations. In accordance with the invention, a first or master motor is provided with a closed loop feedback system based on current requirements of the motor. The current control has a secondary output which, controls the second motor in an open loop. By controlling the second motor with a control signal derived from the first motor control loop, a tight synchronism may be obtained between the two motors, allowing unbalanced loads resulting from differences in operation to be minimized.

BRIEF DESCRIPTION OF THE DRAWINGS

A fuller understanding of the invention may be accomplished upon review of the following disclosure of a preferred, but nonetheless illustrative embodiment of the invention, when reviewed in association with the annexed drawings, wherein.

DETAILED DESCRIPTION OF THE INVENTION

Figure 1:
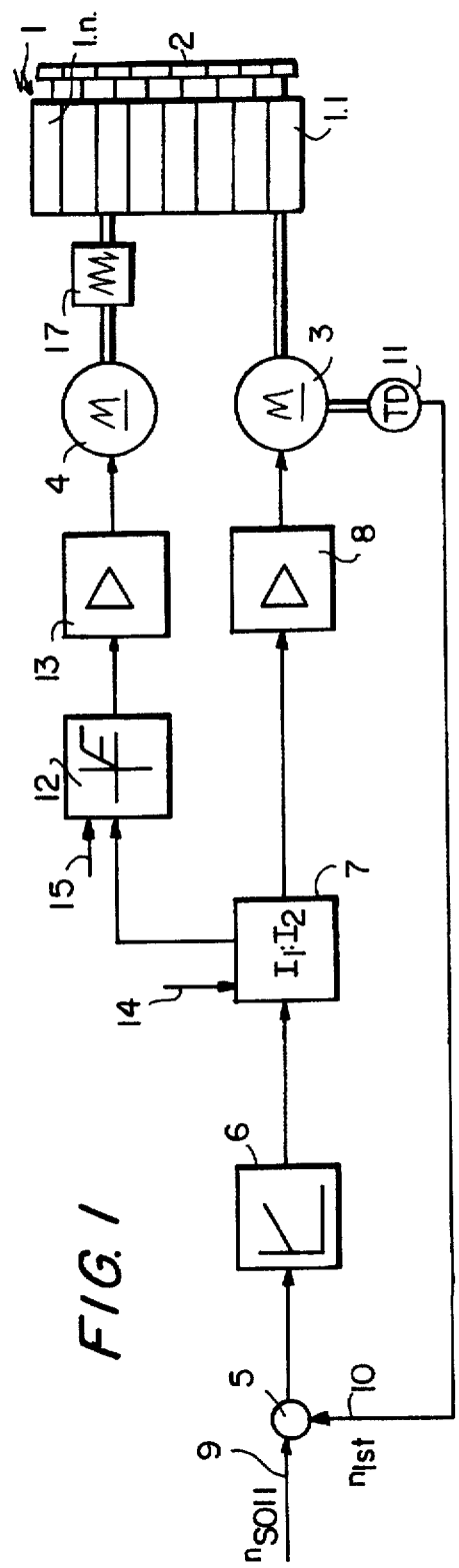
FIG. 1 is a multi-motor drive system in accordance with the present invention including a current limiter in the second motor control.
Figure 2:
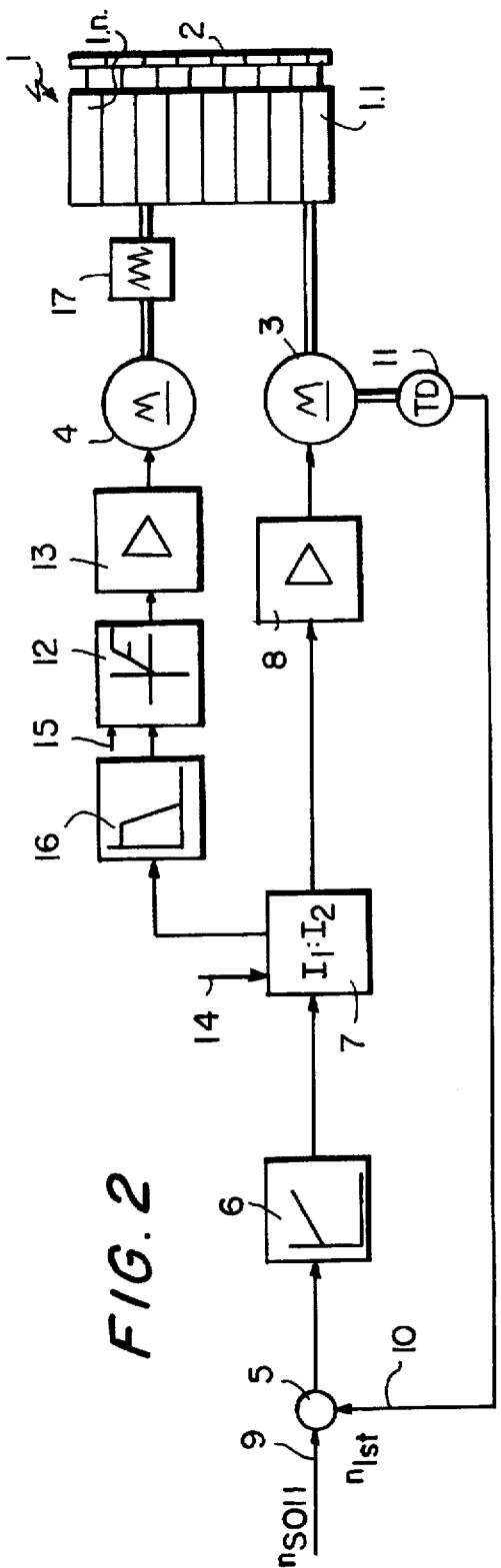
FIG. 2 is a multi-motor drive system having a lowpass filter in the second motor control.

With references to FIGS. 1 and 2, printing press 1 has printing units 1.1 through 1.n, which are connected by a gear train 2. The main or master motor 3 is connected to a first printing unit, while the second motor 4 is connected to another.

Master motor 3 is controlled by a control system having a speed summation node 5, a closed loop speed control 6, a closed loop current control 7, and an output amplifier 8. Speed summation node 5 has a first input for accepting a reference speed signal $n_{set}$ on line 9 which is connected to a conventional speed control system which may be programmed as required in accordance with desired operation of the press 1. The second input to the speed summation node 5 is a signal which represents the actual speed $n_{actual}$ on line 10. This data are generated by tachometer 11, which is coupled to the master motor 3 as known in the art. The output of speed summation node 5, which is typically a difference voltage signal representing the deviation between the set and actual speeds, is directed to closed loop speed control element 6, which may be an amplifier, and whose output is directed to current control 7. The output of current control 7, which is a current signal related to the difference between actual and set speed values, is passed through amplifier 8 to main motor 3. Accordingly, a closed loop control system is developed for the motor 3.

Current control 7 includes a setting input 14. This input allows variation of a second current output for the control 7, which is used to control the second motor 4. The setting input 14 allows the second output to be set in relation to the control current for the first motor. As shown, $I_1$ is the current to be applied to master motor 3, while $I_2$ is the current to be applied to second motor 4.

The ratio of currents set by input 14 is typically related to the operational characteristics of the press system and the location of the motors therein, and is generally of the form $I_2/I_1$=number of printing units beyond the position of motor 2/total number of printing units. Once a ratio is set when the system is placed into service it normally is not readjusted.

In a first embodiment, the second output of current control 7 is fed to a current limiter 12, which may be adjustable through input 15, which provides a maximum current limitation for the motor 4. The output of the limiter is fed through amplifier 13 and then to the second drive motor 4. Preferably, the motor 4 is coupled to the printing press through an elastic-type drive or coupler 17, such as an elastic pulley, which can absorb and moderate torque differences as applied by the motor 4 and as present in the press system through main motor 3.

In the embodiment of FIG. 2, the second output of the current control 7 is coupled to the motor 4 through a lowpass filter 16 and the amplifier 13. Lowpass filter 16 may be of a known composition, containing operational amplifiers and the like, which eliminates high-frequency transients which may be developed in the main motor control loop. This has the further effect of smoothing torque changes to the second motor 4.

In operation, a difference between the adjusted reference speed $n_{set}$ and the present actual speed $n_{actual}$ generated at speed summation node n generates a signal for the speed control 6. The output of the speed control 6 is used to control both the voltage as well as current and torque for both motors 3 and 4. Control of voltage and current are independent or "uncoupled" from each other allowing speed to be set separate and apart from torque consideration. Voltage control is performed in the known manner and is not further shown. In addition, however, the output of speed control 6 is further controlled and proportioned by current control 7 whereby the necessary motor currents to maintain the proper motor torques at the chosen speed are outputted between its first and second outputs. Typically, the currents are set in accordance with a current ratio as set by the control 14. The master motor 3 operates with current $I_1$, while the current $I_2$ is fed to second motor 4.

In the embodiment of FIG. 1, the current fed to the second motor passes through to current limiter 12, which prevents extreme currents, resulting perhaps from an improperly set control 14, from reaching the second motor 4. In addition, the current limiter prevents high current glitches or pulses from being passed to the motor. With the elimination of such pulses and glitches, additional or spurious vibrations are not generated by motor 4; the load in the coupling gear train is thus smooth and decreased. Further disruptions which may occur as the torque is transferred to the printing press are avoided by coupling the motor 4 through the elastic component 17, which similarly serves as a mechanical lowpass filter.

The lowpass filter 16 in the embodiment of FIG. 2 may further include integrating circuitry, as known in the art to further filter peaks and valleys in the secondary current. By smoothing the motor, "soft" control of motor current and thus torque is accomplished. By proper choice of the lowpass filter components, gradual motor current changes may be achieved at predefined speed ranges. Such soft control allows for modulation of the current to the second motor 4 even if the actual reference current supplied by tachometer 11 is subject to variation by vibrations caused by operation of the press. Such modulation helps insure a steady and stable run of the press drive.

We claim:

1. A multiple motor drive system for a printing press having a plurality of printing units interconnected by a gear train, comprising a speed summation node for accepting actual and reference speed data, a closed loop current control coupled to said node, a first output of said current control coupled to a first motor and a second output of said current control coupled to a second motor through a current limiter each of said first and second motors have a torque, said second output of said current control being proportional to the first output, whereby the torque of said second motor can be adjusted with reference to the torque of said first motor.

2. A multiple motor drive system for a printing press having a plurality of printing units interconnected by a gear train, comprising a speed summation node for accepting actual and reference speed data, a closed loop current control coupled to said node, a first output of said current control coupled to a first motor and a second output of said current control coupled to a second motor through a lowpass filter, said second output of said current control being proportional to the first output, whereby the torque of said second motor may be adjusted with reference to the torque of said first motor.

3. The drive system of claim 1 further comprising an elastic drive member after the second motor toward the press.

4. The drive system according to claim 2 further comprising an elastic drive member after the second motor toward the press.

* * * * *